United States Patent
Robert et al.

(10) Patent No.: US 7,739,019 B2
(45) Date of Patent: Jun. 15, 2010

(54) ROUGH ROAD DETECTION

(75) Inventors: Dominique Robert, Benfeld (FR); Herve Scelers, Illkirch-Graffenstaden (FR); Pascal Tissot, Lingolsheim (FR)

(73) Assignee: GM Global Technology Operations, Inc., Detroit, MI (US)

( * ) Notice: Subject to any disclaimer, the term of this patent is extended or adjusted under 35 U.S.C. 154(b) by 1576 days.

(21) Appl. No.: 11/017,362

(22) Filed: Dec. 20, 2004

(65) Prior Publication Data
US 2006/0136111 A1 Jun. 22, 2006

(51) Int. Cl.
G06F 7/00 (2006.01)
G06F 17/00 (2006.01)

(52) U.S. Cl. .............................. 701/65; 701/36; 701/37; 701/38; 701/51; 701/80; 477/45; 477/37; 477/62; 477/140; 477/174; 280/5.515; 280/5.518; 280/5.512; 280/5.514; 73/105; 73/114.12; 303/196

(58) Field of Classification Search .................... 701/65, 701/36, 37, 38, 51, 80; 73/105, 114.12; 303/196; 477/45, 37, 62, 174, 140; 280/5.515, 5.518, 280/5.512, 5.514
See application file for complete search history.

(56) References Cited

U.S. PATENT DOCUMENTS

| | | | | |
|---|---|---|---|---|
| 4,515,040 A | * | 5/1985 | Takeuchi et al. | 477/43 |
| 4,785,690 A | * | 11/1988 | Yokoyama et al. | 477/45 |
| 4,858,496 A | * | 8/1989 | Iwatsuki et al. | 477/33 |
| 5,725,446 A | * | 3/1998 | Kaku et al. | 474/13 |
| 5,911,768 A | * | 6/1999 | Sasaki | 701/38 |
| 5,983,154 A | * | 11/1999 | Morisawa | 701/56 |
| 6,547,692 B1 | * | 4/2003 | Ries-Mueller et al. | 477/45 |
| 6,549,840 B1 | * | 4/2003 | Mikami et al. | 701/69 |
| 6,607,467 B2 | * | 8/2003 | Tabata | 477/33 |
| 6,678,631 B2 | * | 1/2004 | Schiffmann | 702/151 |
| 6,701,235 B2 | * | 3/2004 | Uchiyama et al. | 701/37 |
| 6,790,157 B2 | * | 9/2004 | Tabata | 477/33 |
| 6,790,158 B2 | * | 9/2004 | Tabata | 477/33 |
| 6,817,965 B2 | * | 11/2004 | Tabata | 477/33 |
| 6,842,683 B2 | * | 1/2005 | Kim | 701/70 |
| 7,168,709 B2 | * | 1/2007 | Niwa et al. | 280/5.518 |
| 7,203,579 B2 | * | 4/2007 | Yokota et al. | 701/29 |
| 2001/0023216 A1 | * | 9/2001 | Bolz et al. | 477/44 |
| 2002/0006848 A1 | * | 1/2002 | Tabata | 477/32 |
| 2002/0045977 A1 | * | 4/2002 | Uchiyama et al. | 701/37 |
| 2003/0158646 A1 | * | 8/2003 | Nishida et al. | 701/51 |
| 2003/0195083 A1 | * | 10/2003 | Tabata | 477/168 |
| 2003/0195084 A1 | * | 10/2003 | Tabata | 477/168 |
| 2003/0199361 A1 | * | 10/2003 | Tabata | 477/181 |
| 2004/0242370 A1 | * | 12/2004 | Iwatsuki et al. | 477/45 |
| 2005/0085987 A1 | * | 4/2005 | Yokota et al. | 701/80 |
| 2005/0233846 A1 | * | 10/2005 | Green et al. | 474/47 |
| 2006/0074530 A1 | * | 4/2006 | Meyers et al. | 701/1 |
| 2006/0234828 A1 | * | 10/2006 | Iwatsuki et al. | 477/45 |

* cited by examiner

Primary Examiner—Khoi Tran
Assistant Examiner—Jorge O Peche

(57) ABSTRACT

A rough road detection system for a vehicle comprises a first acceleration sensor that measures vertical acceleration of a component of the vehicle. An adaptive acceleration limits module determines a first acceleration limit based upon a speed of the vehicle. A limit comparison module generates a rough road signal based on a comparison of the first acceleration limit from the adaptive acceleration limits module and the measured acceleration from the first acceleration sensor.

17 Claims, 5 Drawing Sheets

ROUGH ROAD DETECTION

FIELD OF THE INVENTION

The present invention relates to systems for detecting and responding to rough road signals in a vehicle.

BACKGROUND OF THE INVENTION

When a vehicle travels over rough road, vibration is transmitted through wheels of the vehicle, possibly producing adverse effects. For example, the vibration may cause a belt of a continuously variable transmission (CVT) to slip, which increases belt wear and introduces torque disturbances.

Variations in wheel speed caused by the rough road can also stress other engine and drivetrain components. Outputs generated by engine speed (revolutions per minute) and throttle pedal position sensors may also be impacted by the vibration from the rough road. For example, bouncing of the vehicle caused by rough road may cause the driver's foot to bounce on the accelerator pedal in a constructive interference pattern.

SUMMARY OF THE INVENTION

A rough road detection system for a vehicle comprises a first acceleration sensor that measures vertical acceleration of a component of the vehicle. An adaptive acceleration limits module determines a first acceleration limit based upon a speed of the vehicle. A limit comparison module generates a rough road signal based on a comparison of the first acceleration limit from the adaptive acceleration limits module and the measured acceleration from the first acceleration sensor.

In other features, the first acceleration sensor measures vertical acceleration of a front left wheel of the vehicle, and a second acceleration sensor measures vertical acceleration of a front right wheel of the vehicle. The adaptive acceleration limits module also determines a second acceleration limit, wherein the first acceleration limit is an upper bound of vertical acceleration and the second acceleration limit is a lower bound of vertical acceleration.

In still other features, an acceleration calculator reduces vertical acceleration data from the first and second acceleration sensors to a single computed acceleration value. The limit comparison module determines the computed acceleration value is within the acceleration limits if the computed acceleration value is greater than the lower bound and less than the upper bound. The adaptive acceleration limits module selects the first and second acceleration limits from an acceleration limits table based upon the speed of the vehicle. The computed acceleration value is either of the measured vertical acceleration of the front left wheel and the measured vertical acceleration of the front right wheel, whichever has the greater absolute value.

A road condition aware system for a vehicle comprises the rough road detection system and further comprises a continuously variable transmission (CVT) that includes a belt having a tension adjustment, and a control module that determines the tension adjustment on the belt in the CVT when the rough road signal is received from the limit comparison module.

A road condition aware system for a vehicle comprises the rough road detection system and further comprises an automatic transmission including a torque converter having a slip adjustment, and a control module that determines the slip adjustment in the torque converter of the automatic transmission when the rough road signal is received from the limit comparison module.

A road condition aware system for a vehicle comprises the rough road detection system and further comprises a vibration-sensitive sensor, and a control module that includes a filter that receives information from the vibration-sensitive sensor and that adjusts parameters of the filter when the rough road signal is received from the limit comparison module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
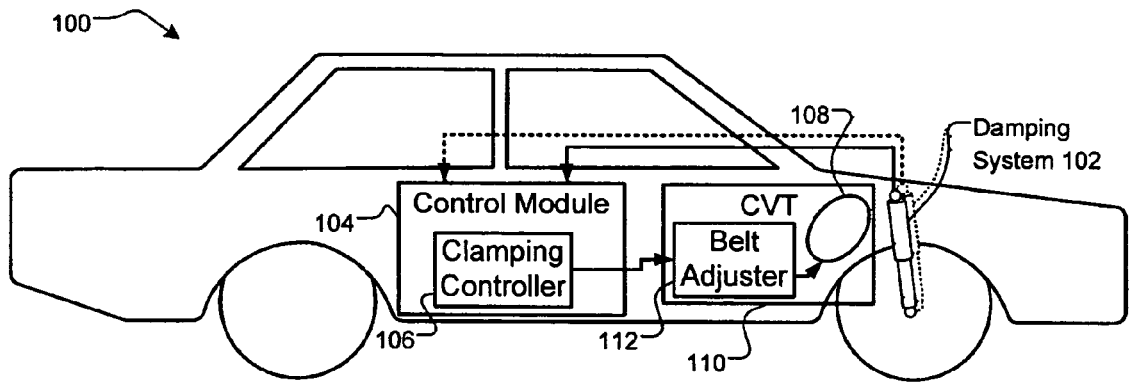
FIG. 1A is a functional block diagram depicting a vehicle including an exemplary road condition aware control module that adjusts a belt of a continuously variable transmission (CVT)

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1A, a vehicle 100 including an exemplary road condition aware control module 104 that adjusts a belt 108 of a continuously variable transmission (CVT) 110 is depicted. A damping system 102 controls the interface between a frame and wheels of the vehicle, which determines how the vehicle reacts to imperfections in a road surface. The damping system 102 includes sensors that measure vertical acceleration of the wheels and that transmit vertical acceleration signals to the control module 104. The control module 104 determines whether the vehicle is on rough road based upon the measured vertical acceleration of the wheels. The control module 104 includes a clamping control module 106, which determines clamping pressure needed on the belt 108 in the CVT 110. This clamping pressure is communicated to a belt adjuster 112 within the CVT 110, which adjusts the pressure on the belt 108 accordingly. Vibration can cause the belt 108 to slip, which accelerates wear, so the clamping pressure on the belt 108 is increased over rough road. Once the rough road condition is no longer present, the pressure on the belt 108 can be relaxed to a normal value.

Figure 1B:
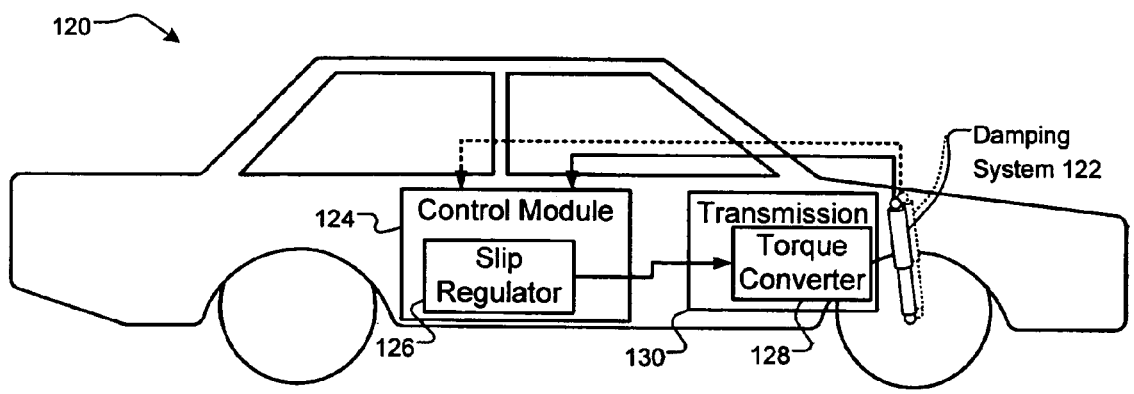
FIG. 1B is a functional block diagram depicting a vehicle including an exemplary road condition aware control module that adjusts slip in a torque converter of an automatic transmission.

Referring now to FIG. 1B, a vehicle 120 including an exemplary road condition aware control module 124 that adjusts slip in a torque converter 128 of an automatic transmission 130 is depicted. A damping system 122 measures vertical acceleration. The acceleration is communicated to a control module 124. The control module 124 includes a torque converter slip regulation module 126. The slip regulation module 126 controls slippage of a the torque converter 128 within the automatic transmission 130. The slip regulation module 126 can allow greater slippage in the torque converter 128 when encountering rough road. With the increased slip, the torque converter 128 can more readily absorb fluctuations in the wheel speed caused by rough road conditions, improving engine speed regulation and ride comfort.

Figure 1C:
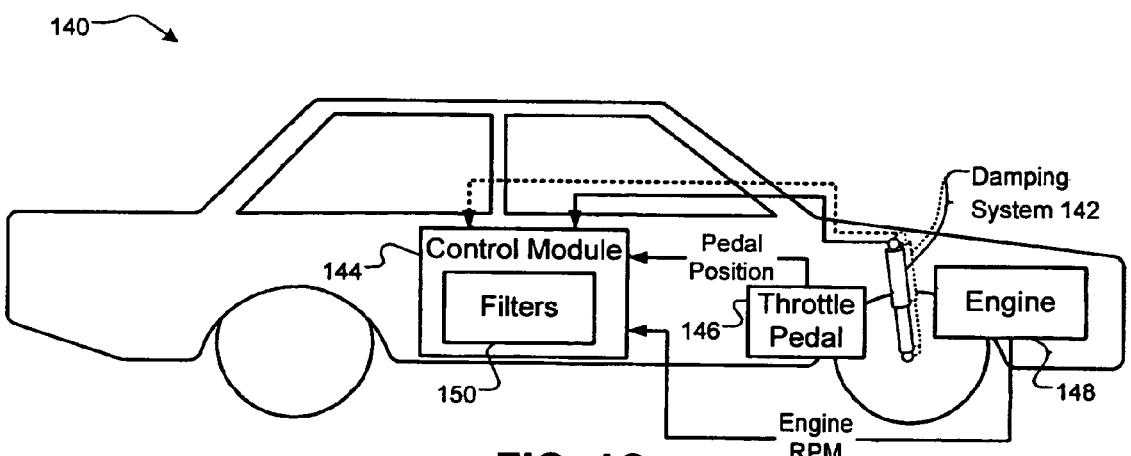
FIG. 1C is a functional block diagram depicting a vehicle including an exemplary control module employing road condition aware filters.

Referring now to FIG. 1C, a vehicle 140 including an exemplary control module 144 employing road condition aware filters is depicted. A damping system 142 measures vertical acceleration and communicates the acceleration to the control module 144. The control module 144 receives throttle pedal position information from a throttle pedal sensor 146 and engine RPM (revolutions per minute) information from an engine 148. Based upon the measured vertical acceleration, the control module 144 determines whether the vehicle is on rough road. The control module 144 can then adapt and/or apply filters 150 to the engine RPM and/or throttle pedal data to remove variation caused by road imperfections. For example, the control module 144 may select a low-pass filter or a running average, or change existing filter constants.

Figure 2A:
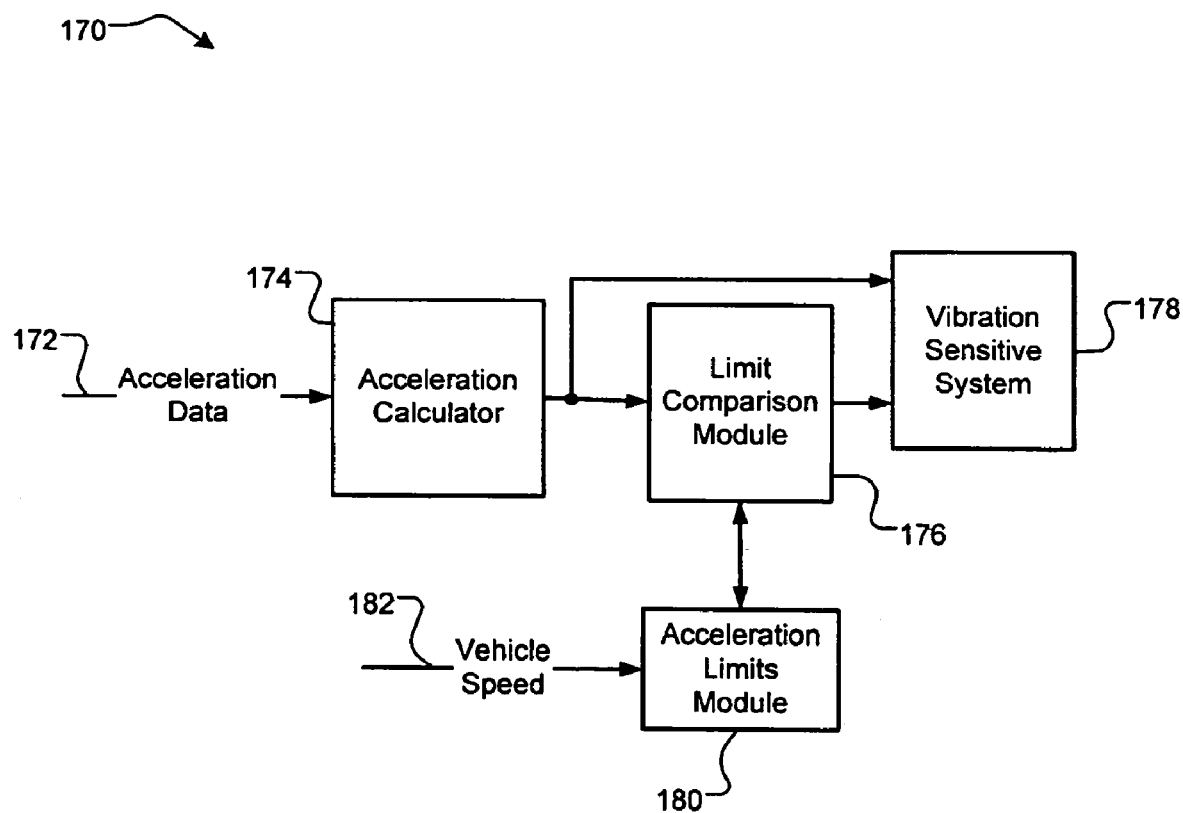
FIG. 2A is a functional block diagram of an exemplary rough road detection system.

Referring now to FIG. 2A, a functional block diagram of an exemplary rough road detection system 170 is depicted. The control module 170 represents a generalized implementation of the rough road detection capability of the control modules 104, 124, and 144. Vertical acceleration data 172 is received by an acceleration calculator 174. The acceleration calculator 174 may reduce and combine the acceleration data 172 received. For example, it could average the acceleration data from each wheel, choose the maximum value, or perform a weighted average. In addition, the acceleration calculator 174 could time average, differentiate, and/or integrate its inputs. The resulting acceleration signals are communicated to a limit comparison module 176 and a vibration-sensitive system 178. The vibration-sensitive system 178 could be, for example, a continuously variable transmission (CVT), an automatic transmission, throttle pedal position sensors, and/or engine RPM sensors.

An acceleration limits module 180 receives vehicle speed information 182. Based upon the vehicle speed information 182, the acceleration limits module 180 outputs acceptable limits for vertical wheel acceleration. These limits can be determined from a look-up table, an equation or set of equations, or a combined approach. The limits may include a positive upper bound and a negative lower bound if the acceleration signals are positive or negative depending upon the direction of acceleration. The limits are communicated to the limit comparison module 176.

The limit comparison module 176 compares the acceleration limits received from the acceleration limits module 180 with the acceleration signals received from the acceleration calculator 174. These comparisons could be accomplished, for example, by comparing modules and/or with fuzzy logic. In addition, the comparison may be instantaneous or may rely on previous values of the comparison. If the acceleration signals are outside the acceleration limits, the road condition is designated as rough. In an example of instantaneous comparison, the road condition is rough if the acceleration is positive and larger than the upper limit, or the acceleration is negative and the absolute value of the acceleration is greater than the absolute value of the lower limit. This designation is communicated to the vibration-sensitive system 178. Based upon whether the road surface is determined to be rough, and how great the acceleration signals are, the vibration-sensitive system 178 can take appropriate action. This action may include, for example, increasing the clamping pressure on a CVT belt, opening the regulation of a torque converter, or filtering sensor information in a control module.

Figure 2B:
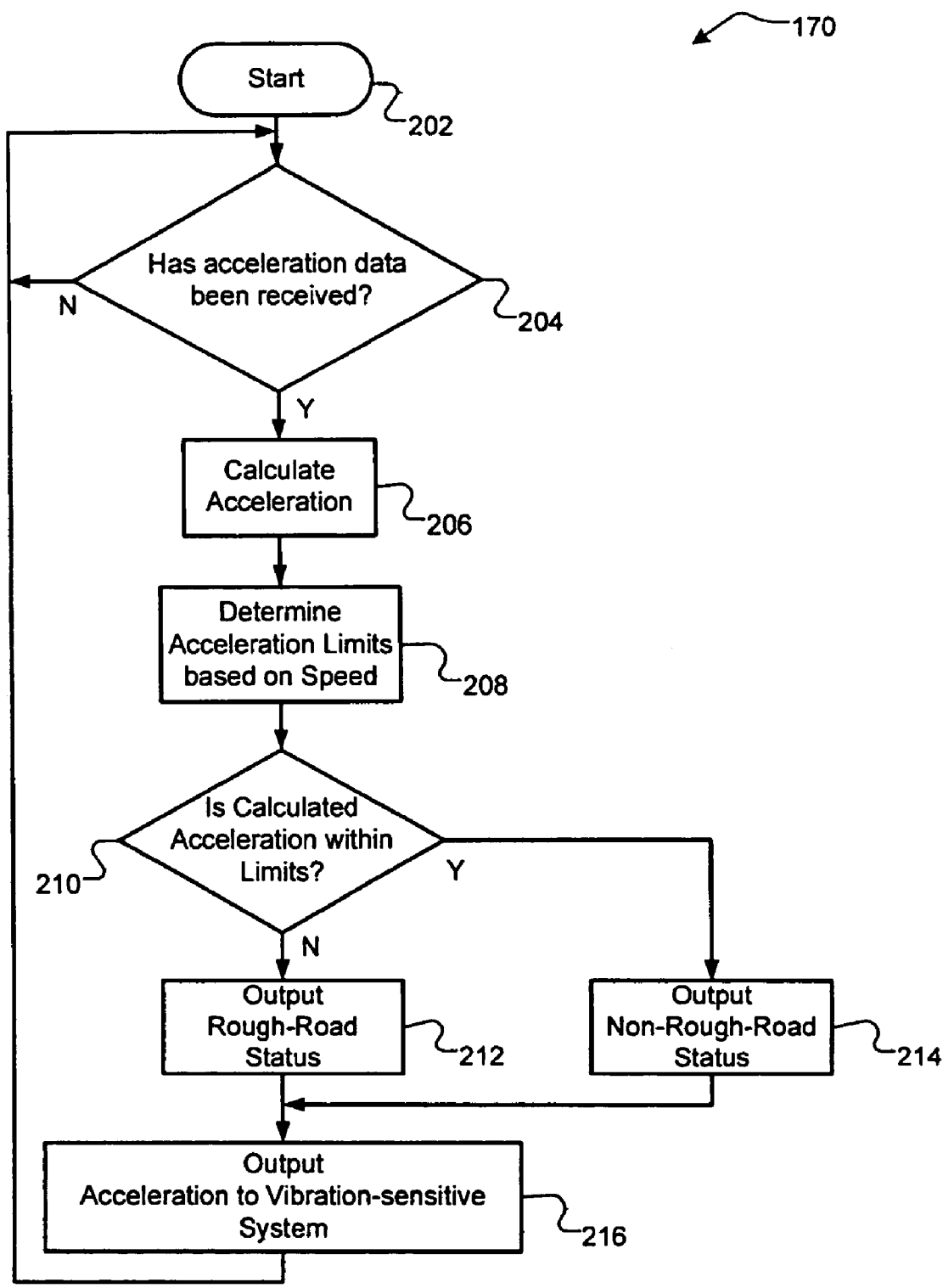
FIG. 2B is a flow chart illustrating exemplary steps performed by the rough road detection system.

Referring now to FIG. 2B, exemplary steps performed by the rough road detection system 170 are described. Control begins at step 202. Once acceleration data has been received in step 204, the data is processed into calculated values in step 206. Acceleration limits are then calculated or selected from a table within the acceleration limits module in step 208 based upon the speed of the vehicle. If the calculated values are not within the acceleration limits in step 210, a rough road status is output in step 212, and control continues in step 216. Otherwise, if the calculated values are within the acceleration limits in step 210, a non-rough-road status, or alternately no status at all, is output in step 214. Control then continues in step 216. The calculated acceleration values are output to the vibration-sensitive system in step 216, and control returns to step 204.

Figure 3A:
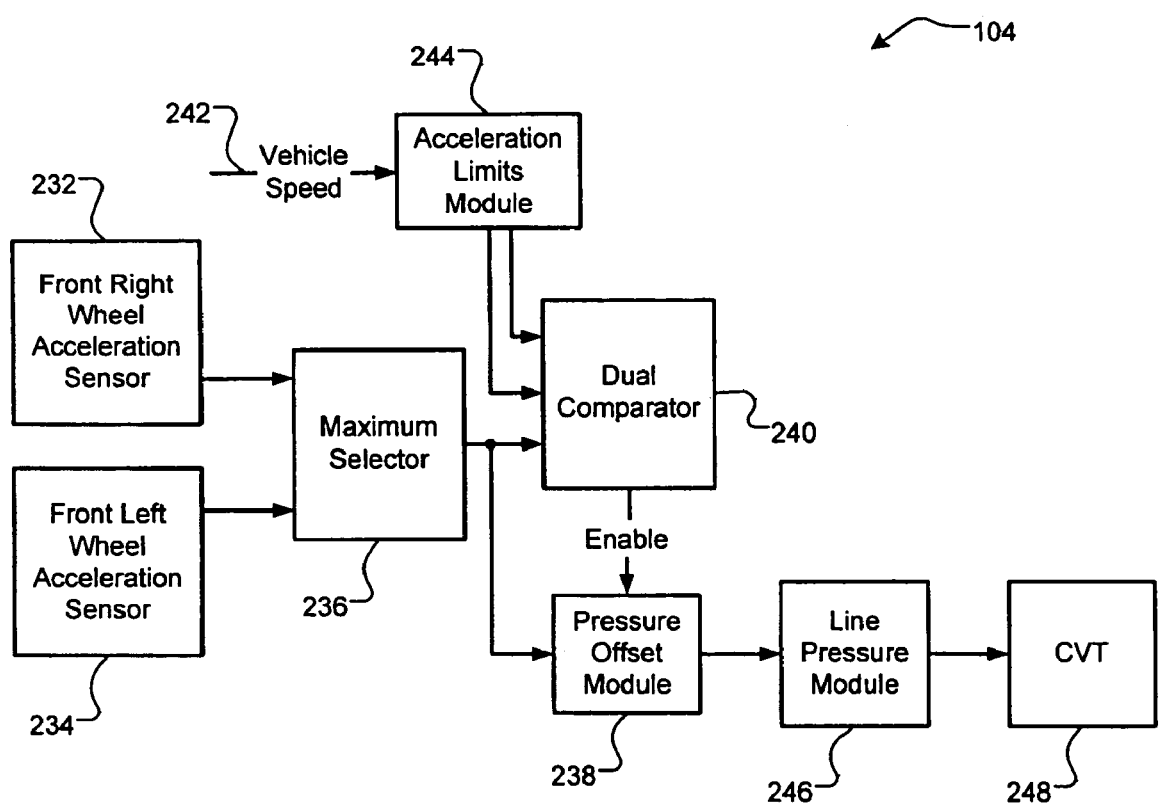
FIG. 3A is a functional block diagram of an exemplary implementation of the road condition aware control module that adjusts a belt of a CVT.

Referring now to FIG. 3A, a functional block diagram of an exemplary implementation of the road condition aware continuously variable transmission (CVT) control module 104 is shown. Acceleration data from the vehicle's front right wheel damping system 232 and acceleration data from the vehicle's front left wheel damping system 234 are received by a maximum selector 236. The maximum selector 236 selects either the right or left wheel acceleration data, whichever has the greater absolute value. The selected acceleration data value is communicated to a pressure offset module 238 and a dual comparator 240. Vehicle speed information 242 is received by an acceleration limits module 244. The acceleration limits module 244 selects an upper and lower acceleration limit from a table contained within the acceleration limits module 244 based upon the vehicle speed 242. The upper and lower acceleration limits are communicated to the dual comparator 240.

The dual comparator 240 determines whether the selected acceleration is greater than the lower limit and less than the upper limit received from the acceleration limits module 244. If the selected acceleration value falls within these limits, the dual comparator 240 communicates a disable signal to the pressure offset module 238. Otherwise, the dual comparator 240 communicates an enable signal to the pressure offset module 238. The pressure offset module 238, if it receives the disable signal, communicates a pressure offset value of zero to a line pressure module 246. If the pressure offset module 238 receives the enable signal from the dual comparator 240, it selects a pressure offset from a table contained within the pressure offset module 238 based upon the selected acceleration value. This pressure value is communicated to the line pressure module 246. The line pressure module 246 adds the pressure offset to the clamping pressure normally exerted on a belt of a CVT 248. The resulting pressure is applied to the belt of the CVT.

Figure 3B:
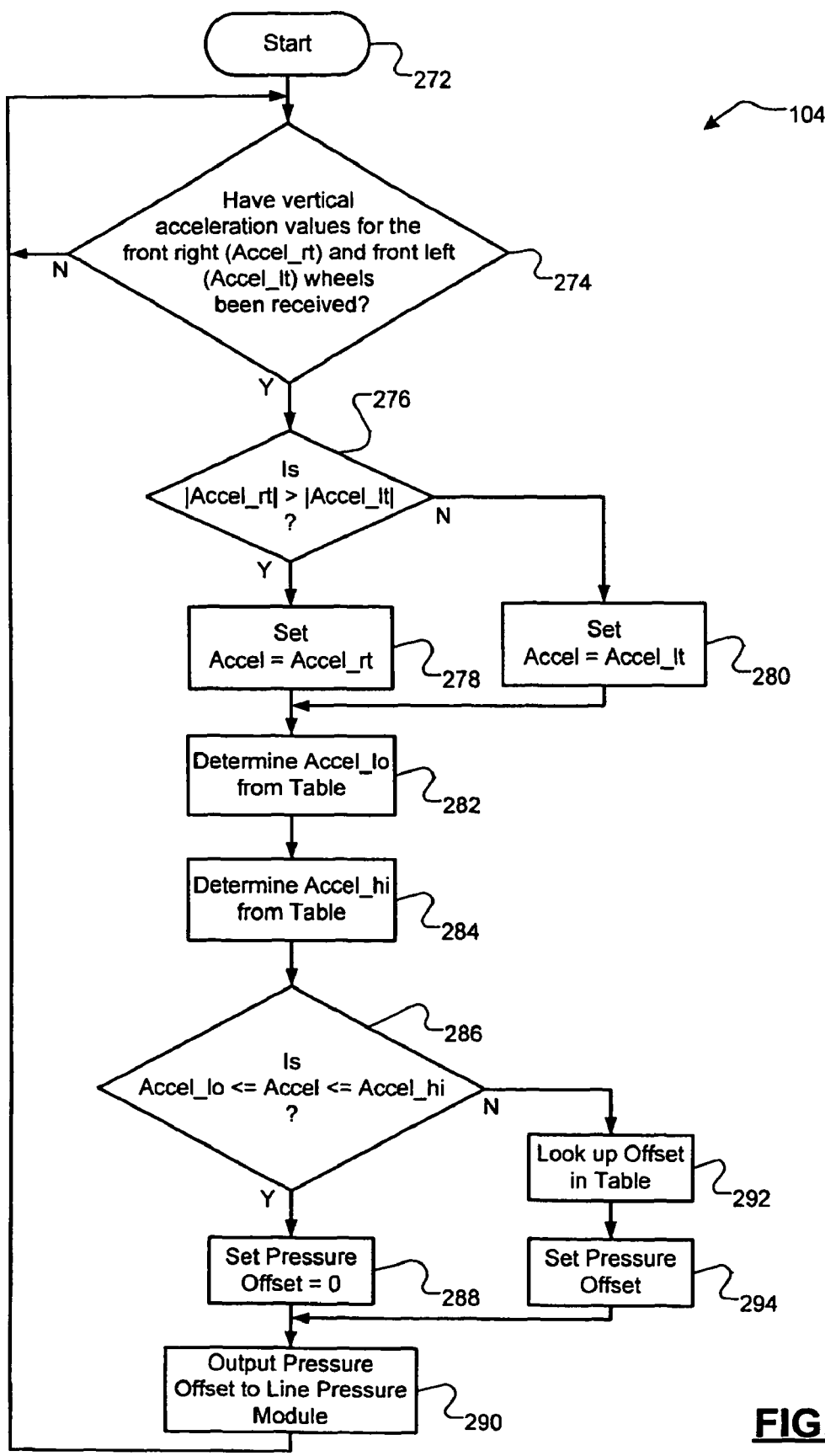
FIG. 3B is a flow chart illustrating exemplary steps performed by the road condition aware control module.

Referring now to FIG. 3B, exemplary steps performed by the road condition aware control module 104 are illustrated. Control begins at step 272. The control module receives vertical acceleration data from the front right and front left wheel damping systems in step 274. The control module then compares the absolute value of the right and left acceleration values in step 276. If the absolute value of the front right acceleration is greater than the absolute value of the front left acceleration, the variable Accel is set to the value of the front right acceleration in step 278. Otherwise, the variable Accel is set to the value of the front left acceleration in step 280. In either case, Accel_lo is next determined from the table within the acceleration limits module based upon vehicle speed in step 282. Accel_hi is also determined from the table within the acceleration limits module based upon vehicle speed in step 284.

Accel is compared to Accel_lo and Accel_hi in step 286. If Accel is between Accel_lo and Accel_hi inclusive, the pressure offset is set to zero in step 288 and control continues in step 290. Otherwise, if Accel is outside of the limits set by Accel_lo and Accel_hi in step 286, a pressure offset value is selected from the table within the pressure offset module in step 292 based on the value of Accel. Then the pressure offset is set based upon this pressure offset value in step 294. Control resumes in step 290, where the pressure offset is output to the line pressure module. Control then returns to step 274 where control waits for acceleration values for the front right and front left wheels to be received.

Skilled artisans will recognize that control modules 104, 124, and 144 can be integrated with an engine control module, powertrain control module, and/or any other vehicle control module.

Those skilled in the art can now appreciate from the foregoing description that the broad teachings of the present invention can be implemented in a variety of forms. Therefore, while this invention has been described in connection with particular examples thereof, the true scope of the invention should be not so limited since other modifications will become apparent to the skilled practitioner upon a study of the drawings, the specification and the following claims.

What is claimed is:

1. A road condition aware system for a vehicle comprising:
a first acceleration sensor that measures vertical acceleration of a component of the vehicle;
an adaptive acceleration limits module that determines a first acceleration limit based upon a speed of the vehicle;
a limit comparison module that generates a rough road signal based on a comparison of the first acceleration limit from the adaptive acceleration limits module and the measured acceleration from the first acceleration sensor;
a continuously variable transmission (CVT) that includes a belt having a tension adjustment; and
a control module that determines the tension adjustment on the belt in the CVT when the rough road signal is received from the limit comparison module.

2. The road condition aware system of claim 1 further comprising a second acceleration sensor, wherein the first acceleration sensor measures vertical acceleration of a front left wheel of the vehicle, and the second acceleration sensor measures vertical acceleration of a front right wheel of the vehicle.

3. The road condition aware system of claim 2 wherein the adaptive acceleration limits module also determines a second acceleration limit, wherein the first acceleration limit is an upper bound of vertical acceleration and the second acceleration limit is a lower bound of vertical acceleration.

4. The road condition aware system of claim 3 further comprising an acceleration calculator that reduces vertical acceleration data from the first and second acceleration sensors to a single computed acceleration value.

5. The road condition aware system of claim 4 wherein the limit comparison module determines the computed acceleration value is within the acceleration limits if the computed acceleration value is greater than the lower bound and less than the upper bound.

6. The road condition aware system of claim 5 wherein the adaptive acceleration limits module selects the first and second acceleration limits from an acceleration limits table based upon the speed of the vehicle.

7. The road condition aware system of claim 6 wherein the computed acceleration value is either of the measured vertical acceleration of the front left wheel and the measured vertical acceleration of the front right wheel, whichever has the greater absolute value.

8. The road condition aware system of claim 1 wherein the control module determines the tension adjustment based upon the measured vertical acceleration.

9. A vibration-sensitive powertrain adjustment system for a vehicle comprising:
an acceleration sensor that measures vertical acceleration of a component of the vehicle;
a rough road detection system that analyzes the measured acceleration and generates a road condition signal;
a control module that generates an operating parameter adjustment signal based upon a speed of the vehicle and the road condition signal; and
a vibration-sensitive system that adjusts an operating parameter based on the operating parameter adjustment signal, wherein the vibration-sensitive system is a continuously variable transmission (CVT) and the operating parameter is a tension on a belt within the CVT.

10. A road condition aware control system for a continuously variable transmission (CVT) comprising:
a first acceleration sensor that measures vertical acceleration of a component of the vehicle;
an adaptive acceleration limits module that determines a first acceleration limit based upon a speed of the vehicle;
a limit comparison module that compares the first acceleration limit from the acceleration limits module with the measured acceleration from the first acceleration sensor,
wherein the limit comparison module outputs a rough road signal if the measured acceleration is outside of the first acceleration limit;
a pressure offset module that determines and outputs a pressure offset; and
a line pressure module that increases clamping pressure on a belt of the CVT by the pressure offset received from the pressure offset module when the rough road signal is received from the limit comparison module.

11. The road condition aware control system of claim 10 further comprising a second acceleration sensor, wherein the first acceleration sensor measures vertical acceleration of a front left wheel of the vehicle, and the second acceleration sensor measures vertical acceleration of a front right wheel of the vehicle.

12. The road codition aware control system of claim 11 further comprising a second acceleration limit, wherein the first acceleration limit is an upper bound of vertical acceleration and the second acceleration limit is a lower bound of vertical acceleration.

13. The road condition aware control system of claim 12 further comprising an acceleration calculator that reduces vertical acceleration data from the first and second acceleration sensors to a single computed acceleration value.

14. The road condition aware control system of claim 13 wherein the limit comparison module determines the computed acceleration value is within the acceleration limits if the computed acceleration value is greater than the lower bound and less than the upper bound.

15. The road condition aware control system of claim 14 wherein the adaptive acceleration limits module selects the first and second acceleration limits from an acceleration limits table based upon the speed of the vehicle.

16. The road condition aware control system of claim 15 wherein the pressure offset module selects the pressure offset from a table based upon the computed acceleration value.

17. The road condition aware control system of claim 16 wherein the computed acceleration value is either of the measured vertical acceleration of the front left wheel and the measured vertical acceleration of the front right wheel, whichever has the greater absolute value.

* * * * *